(12) United States Patent
Kilibarda

(10) Patent No.: US 8,308,048 B2
(45) Date of Patent: Nov. 13, 2012

(54) ROBOTIC HIGH DENSITY WELDING BODY SHOP

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 0 days.

(21) Appl. No.: 13/076,470

(22) Filed: Mar. 31, 2011

(65) Prior Publication Data

US 2011/0192007 A1 Aug. 11, 2011

Related U.S. Application Data

(62) Division of application No. 12/262,722, filed on Oct. 31, 2008.

(60) Provisional application No. 61/035,922, filed on Mar. 12, 2008.

(51) Int. Cl.
B23K 37/04 (2006.01)

(52) U.S. Cl. ........... 228/49.6; 29/430; 29/771; 228/47.1

(58) Field of Classification Search .................. 228/47.1, 228/49.6; 29/430, 771
See application file for complete search history.

(56) References Cited

U.S. PATENT DOCUMENTS

| | | |
|---|---|---|
| 3,854,889 A | 12/1974 | Lemelson |
| 4,232,370 A | 11/1980 | Tapley |
| 4,328,422 A | 5/1982 | Loomer |
| 4,369,563 A | 1/1983 | Williamson |
| 4,442,335 A | 4/1984 | Rossi |
| 4,530,056 A | 7/1985 | MacKinnon et al. |
| 4,659,895 A | 4/1987 | Di Rosa |
| 4,679,297 A | 7/1987 | Hansen, Jr. et al. |
| 4,736,515 A | 4/1988 | Catena |
| 4,738,387 A | 4/1988 | Jaufmann et al. |
| 4,815,190 A | 3/1989 | Haba, Jr. et al. |
| 5,011,068 A | 4/1991 | Stoutenburg et al. |
| 5,347,700 A * | 9/1994 | Tominaga et al. ............. 29/430 |
| 5,577,595 A | 11/1996 | Pollock et al. |
| 6,059,169 A | 5/2000 | Nihei et al. |

(Continued)

FOREIGN PATENT DOCUMENTS

DE 19806963 A1 10/1998

(Continued)

OTHER PUBLICATIONS

FMC; Automated Fork lifts and Material Handling Lifts-Forked Automated Guided Vehicles; http://www.fmcsgvs.com/content/products/forked_vehicles.htm; p. 1.

(Continued)

*Primary Examiner* — Nicholas D'Aniello
(74) *Attorney, Agent, or Firm* — Young Basile

(57) ABSTRACT

A method and apparatus for managing the delivery of component parts and tooling to a robotic welding assembly positioned on a motor vehicle body assembly line. Automatic guided vehicles deliver component parts from a source of parts to a parts staging area on the robotic welding assembly including a substage awaiting area, a substage in-use area and a substage empty area, and further automatic guided vehicles deliver tooling from a tooling management area to the robotic welding assembly whereafter the tooling, upon model changeover, is moved to a tooling use area proximate the assembly line whereafter, upon further model changeover, the tooling is removed from the tooling use area and loaded onto an automatic guided vehicle for return to the tooling management area.

10 Claims, 21 Drawing Sheets

U.S. PATENT DOCUMENTS

| | | | |
|---|---|---|---|
| 6,065,200 A | 5/2000 | Negre | |
| 6,098,268 A | 8/2000 | Negre et al. | |
| 6,336,582 B1 | 1/2002 | Kato et al. | |
| 6,457,231 B1 | 10/2002 | Carter et al. | |
| 6,516,234 B2 | 2/2003 | Kamiguchi et al. | |
| 6,564,440 B2 | 5/2003 | Oldford et al. | |
| 6,744,436 B1 | 6/2004 | Chirieleison, Jr. et al. | |
| 6,799,673 B2 | 10/2004 | Kilabarda | |
| 6,948,227 B2 | 9/2005 | Kilibarda et al. | |
| 7,331,439 B2 | 2/2008 | Degain et al. | |
| 2003/0037432 A1* | 2/2003 | McNamara | 29/771 |
| 2004/0020974 A1 | 2/2004 | Becker et al. | |
| 2004/0221438 A1 | 11/2004 | Savoy et al. | |
| 2005/0120536 A1 | 6/2005 | Kilibarda et al. | |
| 2006/0157533 A1 | 7/2006 | Onoue et al. | |
| 2008/0084013 A1 | 4/2008 | Kilibarda | |
| 2008/0131255 A1 | 6/2008 | Hessler et al. | |

FOREIGN PATENT DOCUMENTS

| | | |
|---|---|---|
| EP | 0261297 A1 | 3/1988 |
| EP | 0446518 A1 | 9/1991 |
| EP | 1403176 A2 | 3/2004 |
| GB | 2250723 A | 6/1992 |
| WO | 8603153 A1 | 6/1986 |
| WO | 2006109246 A1 | 10/2006 |

OTHER PUBLICATIONS

FMC; SGV (Self Guided Vehicles)—Automated Guided Vehicle Systems; http://www.fmcsgvs.com/content/products/sgv.htm; p. 1.

FMC; Automated Material Handling Systems & Equipment for Material Movement: AGV Applications; http://www.fmcsgvs.com/content/sales/applications.htm; pp. 1-2.

FMC; Layout Wizard AGV Configuration Software; http://fmcsgvs.com/content/products/wizard.htm; p. 1.

FMC; AGV System Controls; http://www.fmcsgvs.com/content/products/system.htm; p. 1.

FMC; Laser Navigation Controls; http://www.fmcsgvs.com/content/products/nav.htm; pp. 1-2.

European Search Report dated Apr. 19, 2011 from the corresponding European Patent Application No. 11152656.2-2302.

* cited by examiner

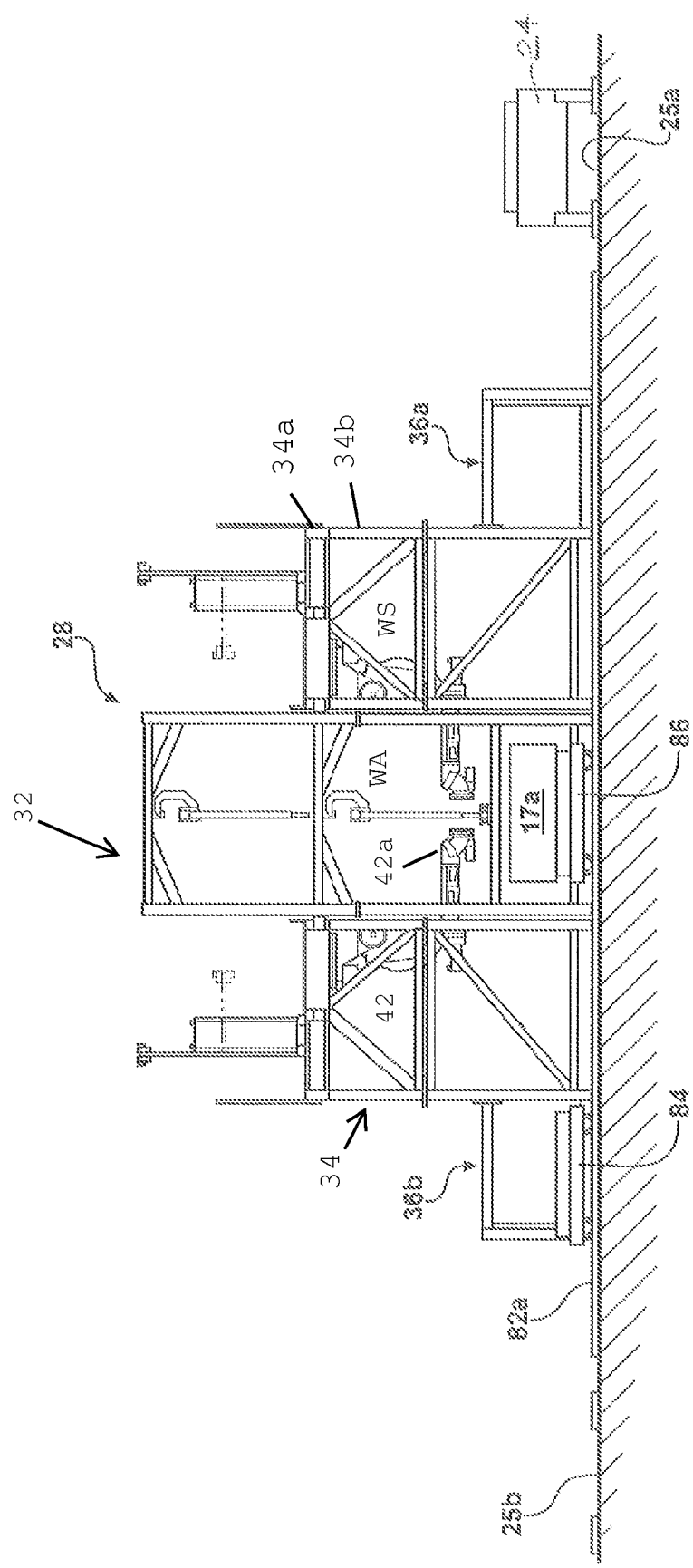

ROBOTIC HIGH DENSITY WELDING BODY SHOP

CROSS-REFERENCE TO RELATED APPLICATIONS

This is a divisional application which claims priority benefit to U.S. patent application Ser. No. 12/262,722 filed on Oct. 31, 2008 and U.S. Provisional Patent Application 61/035,922 filed Mar. 12, 2008, the entire contents of both prior applications are incorporated herein by reference.

BACKGROUND OF THE INVENTION

This invention relates to motor vehicle manufacturing and more particularly to a high density welding body shop to facilitate manufacture of motor vehicle bodies.

Whereas a myriad of vehicle body shop configurations have been proposed or implemented, the typical motor body shop continues to require large amounts of manpower, continues to consume a large factory footprint, continues to require complex equipment and procedures to supply component parts to the assembly line, and continues to require complex equipment and procedures to exchange tooling to facilitate model changeover.

SUMMARY OF THE INVENTION

The invention provides a body shop configuration that provides unlimited flexibility with respect to manufacture of differing body styles; facilitates batch build with limited random potential; provides unmatched modularity with respect to tooling layout material aisles etc; provides optimum material management with respect to flexible delivery and staging and sequencing; optimizes material delivery; optimizes material loading; optimizes fixture exchange, fixture maintenance and fixture staging; maximizes robot density; facilitates an optimum maintenance strategy; facilitates production scheduling and floor space utilization; desensitizes product architecture; desensitizes build sequence; optimizes manpower utilization, traffic engineering, and equipment utilization; and facilitates engineering build, installation, maintenance, and material management.

The invention is specifically directed to a method and apparatus for managing a motor vehicle body shop assembly of the type including a body assembly line and a robotic welding assembly device (RAD) positioned on the assembly line. The invention methodology comprises providing at least one automotive guide vehicle (AGV), a source of parts located on parts racks, a tooling management area including first model tooling for use by the RAD to assemble a first motor vehicle model and second model tooling for use by the RAD to assemble a second motor vehicle model, means defining a movement path for the AGV extending from the source of parts and the tooling management area to the RAD and returning to the source of parts and the tooling management area, and means for guiding the at least one AGV for selective movement along the movement path between the source of parts, the tooling management area, and the RAD; and utilizing the at least one AGV to selectively deliver first model tooling and second model tooling to the RAD for use in respectively assembling the first motor vehicle model and the second motor vehicle model, return the first model tooling or second model tooling not in use to the tooling management area, and to deliver full parts racks from the source of parts to the RAD and return empty parts racks to the source of parts.

According to a further feature of the invention methodology, the RAD defines a staging area including a substage awaiting area, a substage in-use area, and a substage empty area arranged sequentially along and proximate the movement path and, with a full first parts racks in the substage in-use area for use by the RAD, an empty second parts rack in the substage empty area, and a void in the substage awaiting area, an AGV carrying a full third parts rack is moved from the source of parts to the staging area, the full third parts rack is loaded onto the substage awaiting area, the empty second parts rack is loaded onto the AGV, and the AGV is returned to the source of parts.

According to a further feature of the invention, following depletion of the parts from the full first parts rack at the substage in-use area, the now empty first parts rack is moved from the substage in-use area to the now empty substage empty area and the full third parts rack at the substage awaiting area is moved to the now empty substage in-use area for use by the RAD.

According to a further feature of the invention method, an AGV carrying a full fourth parts rack is thereafter moved from the source of parts to the staging area, the full fourth parts rack is unloaded onto the substage awaiting area, the empty first parts rack is unloaded onto the AGV, and the AGV is returned to the source of parts.

According to a further feature of the invention methodology, the movement of an AGV carrying a full parts rack from the source of parts to the staging area initially comprises movement of the AGV to the substage awaiting area, whereafter the full parts rack is unloaded onto the substage awaiting area, the AGV is moved to the substage empty area, an empty parts rack at the substage empty area is loaded onto the AGV, and the AGV is returned to the source of parts.

According to a further feature of the invention methodology, the RAD defines a tooling use area and, with a first model tooling in the tooling use area for use by the RAD, an AGV carrying a second model tooling is moved from the tooling management area to the RAD, the second model tooling is unloaded onto the RAD, and thereafter, following the completion of the first model vehicle production, the first model tooling is removed from the tooling use area, the second model tooling is moved to the tooling use area, the first model tooling is unloaded onto an AGV, and the AGV is returned to the tooling management area.

According to a further feature of the invention methodology, the movement path includes a first movement path portion extending from the tooling management area to a location proximate one side of the RAD and a second movement path portion extending from a location proximate an opposite side of the RAD to the tooling management area; and the movement of the second model tooling from the tooling management area to the RAD is along the first movement path portion and the movement of the first model tooling to the tooling management area to the RAD is along the second movement path portion.

Further features of the invention relate to systems and apparatus for carrying out the above-identified methodology features.

BRIEF DESCRIPTION OF THE DRAWINGS

The description herein makes reference to the accompanying drawings wherein like reference numerals refer to like parts throughout the several views, and wherein:

FIGS. 16-21 are sequential views illustrating a tool exchange system methodology according to the invention.

DETAILED DESCRIPTION OF THE PREFERRED EMBODIMENT

Figure 1:
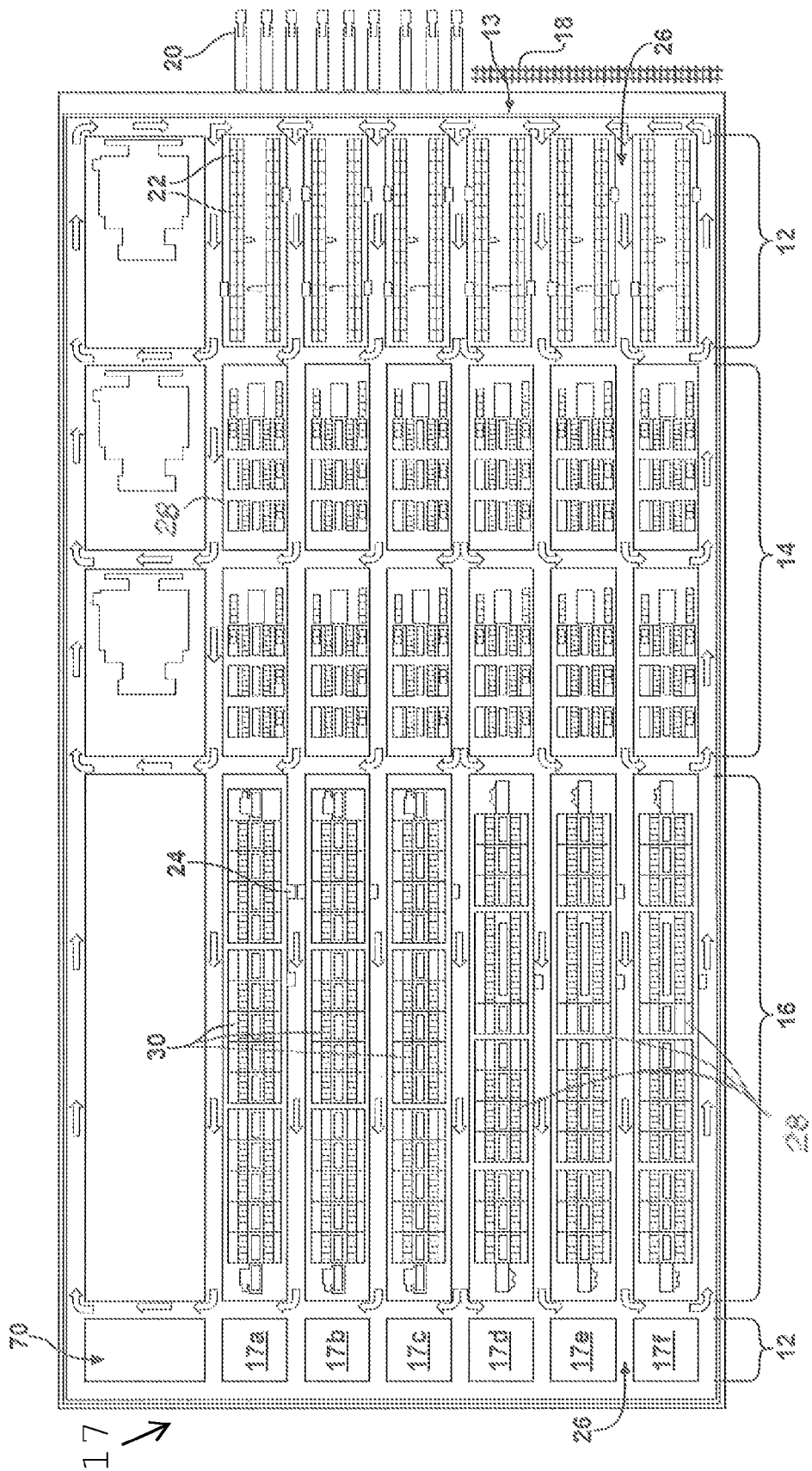
FIG. 1 is an overall layout plan of a welding body shop according to the invention.
Figure 2:
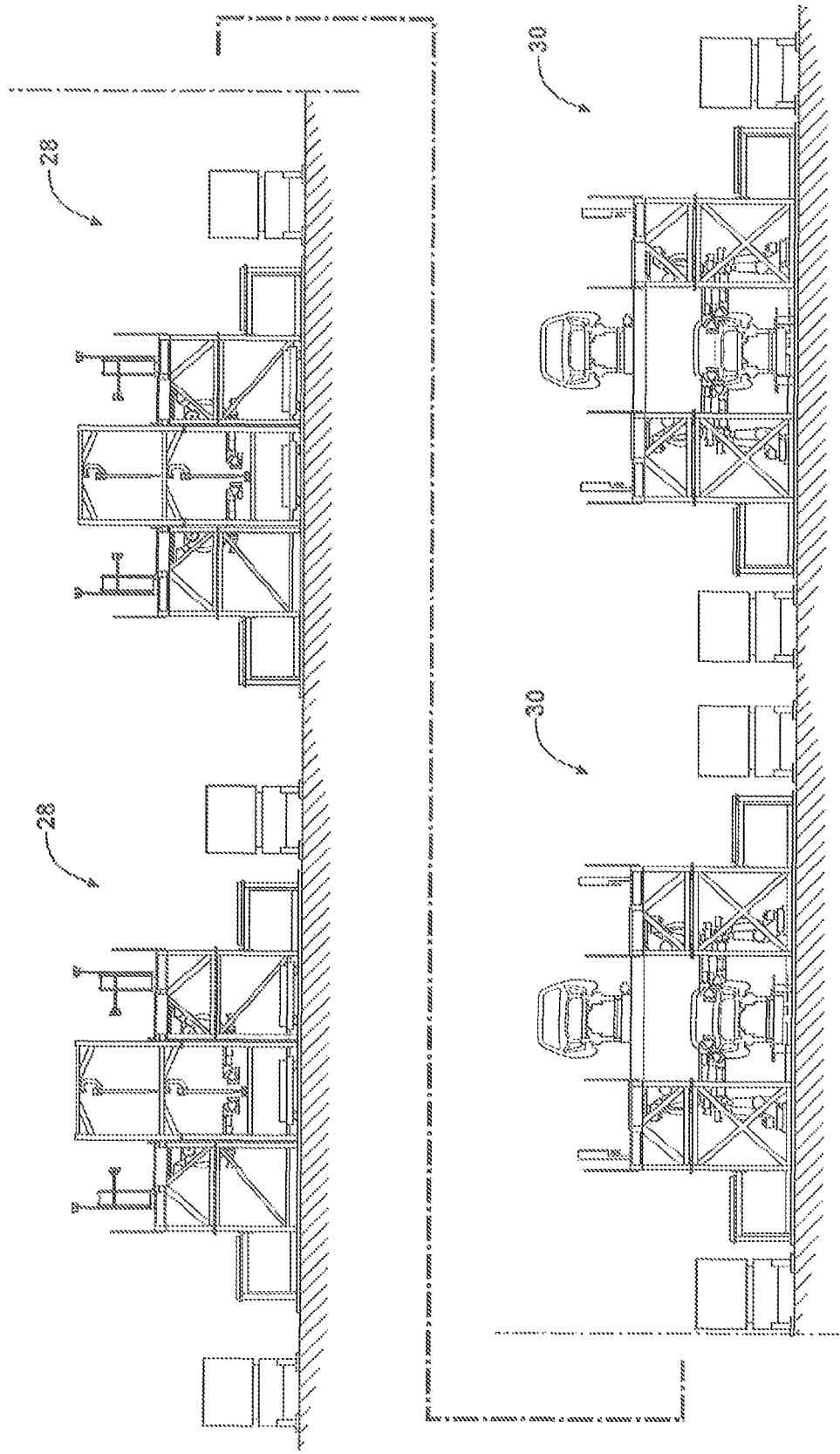
FIG. 2 is a partial end elevational view of the body shop of FIG. 1.
Figure 3:
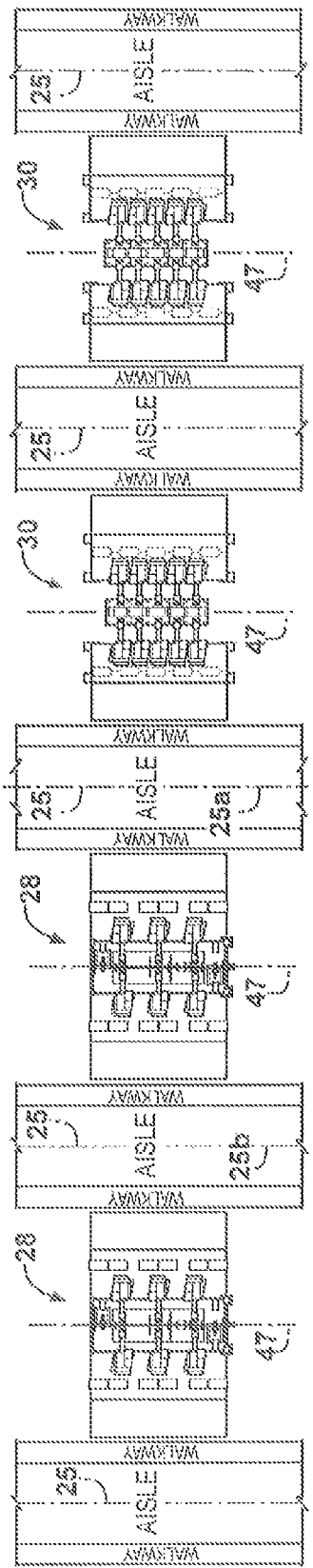
FIG. 3 is a fragmentary plan view of the body shop of FIG. 1.
Figure 4:
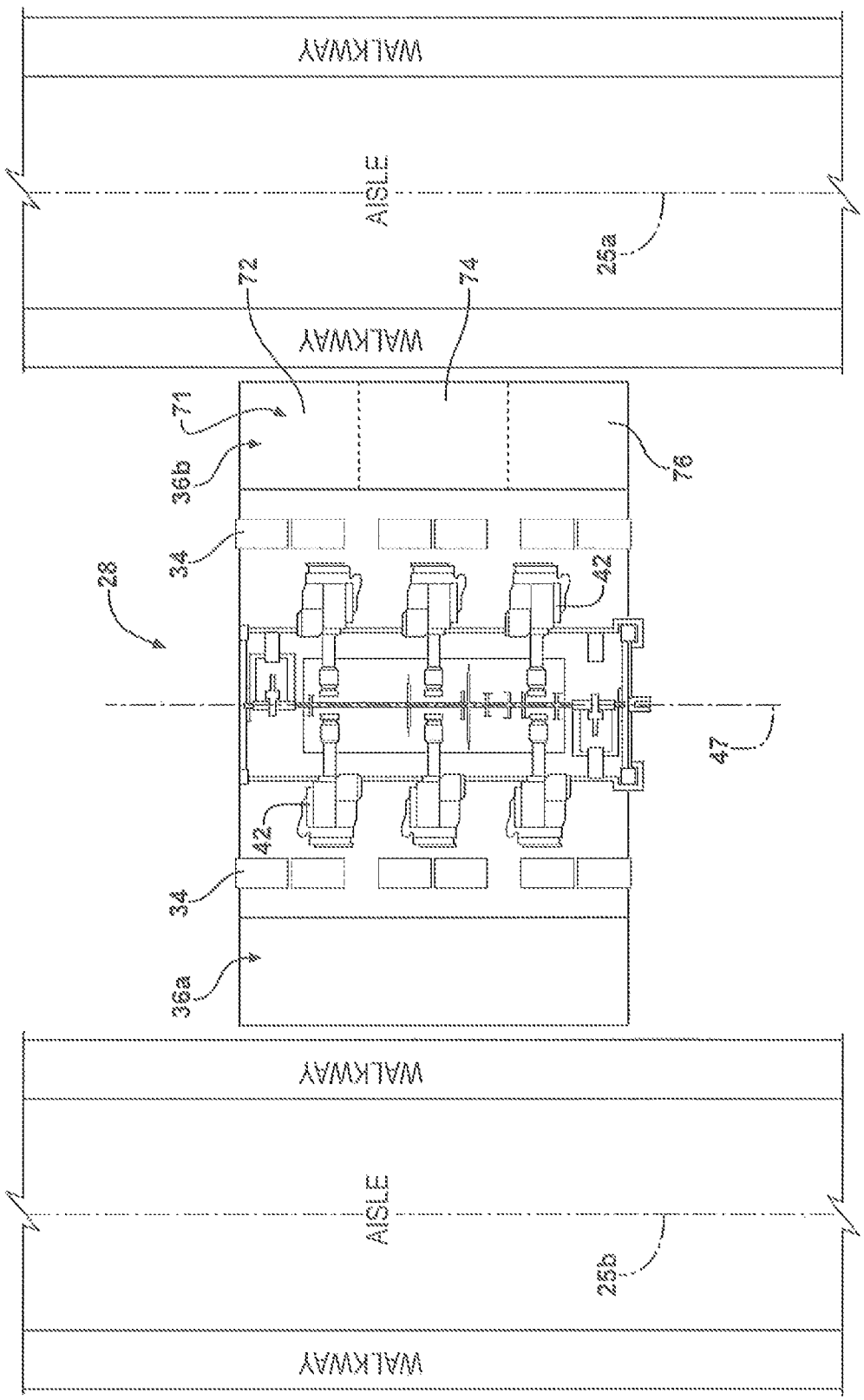
FIG. 4 is a plan view of a portion of the body shop as shown in FIG. 3.
Figure 5:
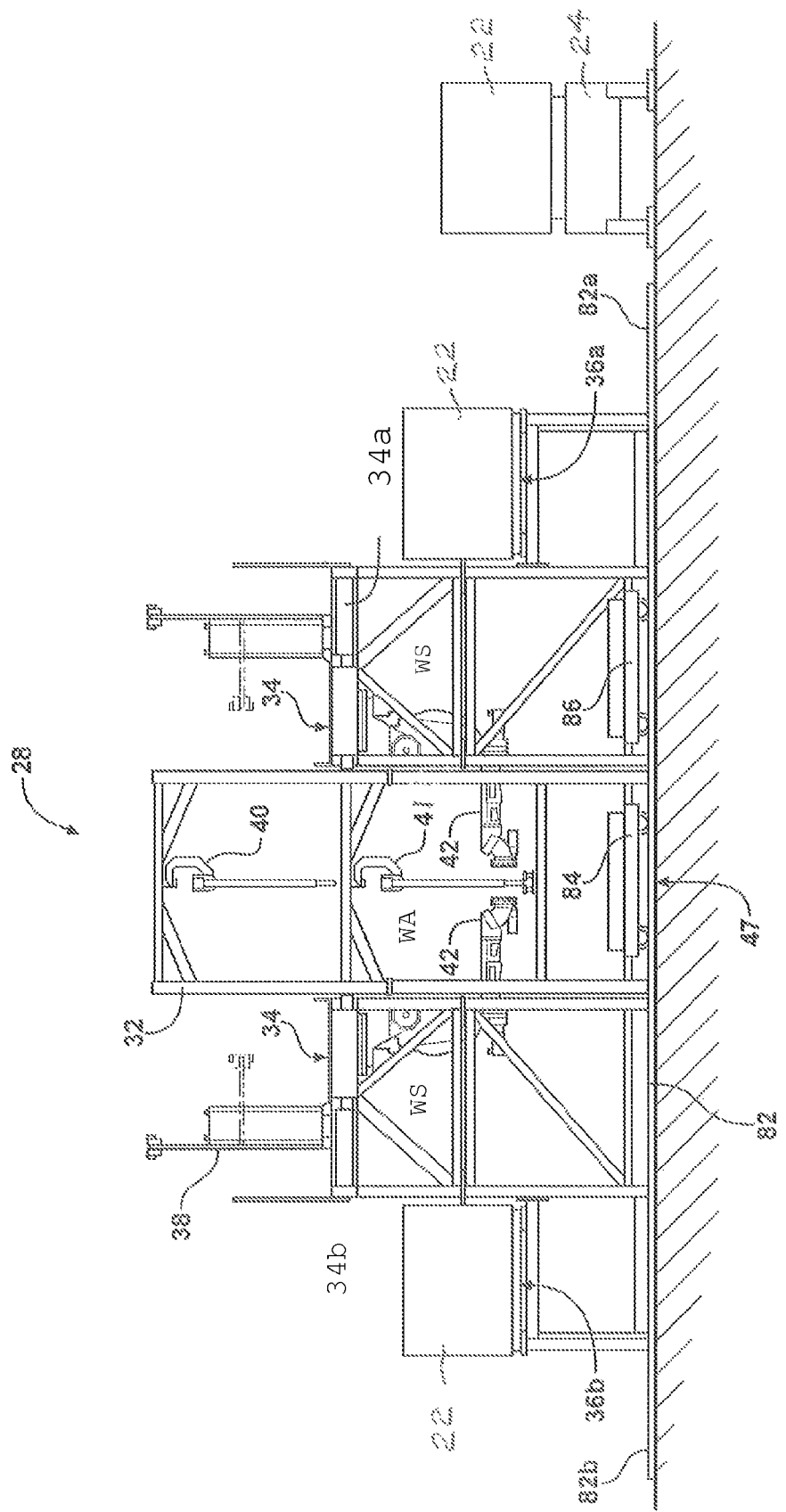
FIG. 5 is an end elevational view of a roller assembly utilized in the invention body shop.

The invention body shop 10 as seen in overview in FIG. 1 includes a material management area 12, a sub-assembly area 14, a main line area 16 and a tool management area 17. Material and work flow in FIG. 1 is essentially from right to left with provision for return movement and tooling exchange flow in FIG. 1 is essentially from left to right with provision for return movement. Material management area 12 will be seen to constitute a source of component parts for the welding operations.

In material management area 12, material arriving at loading dock 13 by rail 18 or semitrailers 20 is unloaded and stacked in dunnage containers whereafter it is removed from the dunnage containers, placed in parts racks 22, and, as needed, loaded onto Automatic Guided Vehicles (AGV) 24 for automatic battery powered movement down aisles 26 to selectively deliver the materials to sub assembly area 14 and main line area 16.

Sub assembly area 14 consists of six parallel rows of roller assemblies 28 arranged between respective aisles 26.

Main line area 16 consists of six parallel rows of robotic welding assembly devices including three parallel rows of robotic roller assemblies 28 and three parallel rows of robotic pallet assemblies 30 arranged between the respective aisles 26.

Each robotic roller assembly 28 (FIGS. 2, 3, 4, 5 and 9) comprises an open scaffold structure including a central tower structure 32, laterally spaced robot scaffold platform structures 34, and outboard flanking shelves 36a, 36b. Each robot scaffold platform structure 34 includes a top wall structure 34a and leg support structure 34b extending downwardly from the top wall structure 34a to define an open working space WS below the top wall structure. Each robot roller assembly 28 further includes robot controllers 38 mounted on robot top walls 34a, an upper overhead carrier 40, a lower overhead carrier 41, and a plurality of robots 42, all arranged in symmetrical alignment with a central assembly line 47. For example, three inverted robots 42 may be suspended from the top wall 34a of each robot platform structure for a total of six robots. The inverted robots are supported in longitudinally spaced relation on the top wall 34a of each scaffold structure and extend downwardly from the top wall into the working space WS below the top wall. The laterally spaced scaffold structures 34 define a weld area WA therebetween and the lower ends 42a of the inverted robots extend into the weld area WA where the lower ends 42a of the inverted robots on one scaffold structure 34 may coact with the lower ends 42a of the inverted robots on the laterally adjacent scaffold structure 34 to perform welding or other operations on motor vehicle components positioned in the weld area WA.

Further details of robotic roller assembly 28 may be seen in U.S. Pat. Nos. 6,799,673 and 6,564,440, both assigned to the assignee of the present application, the disclosures of which are both incorporated herein by reference.

Figure 6:
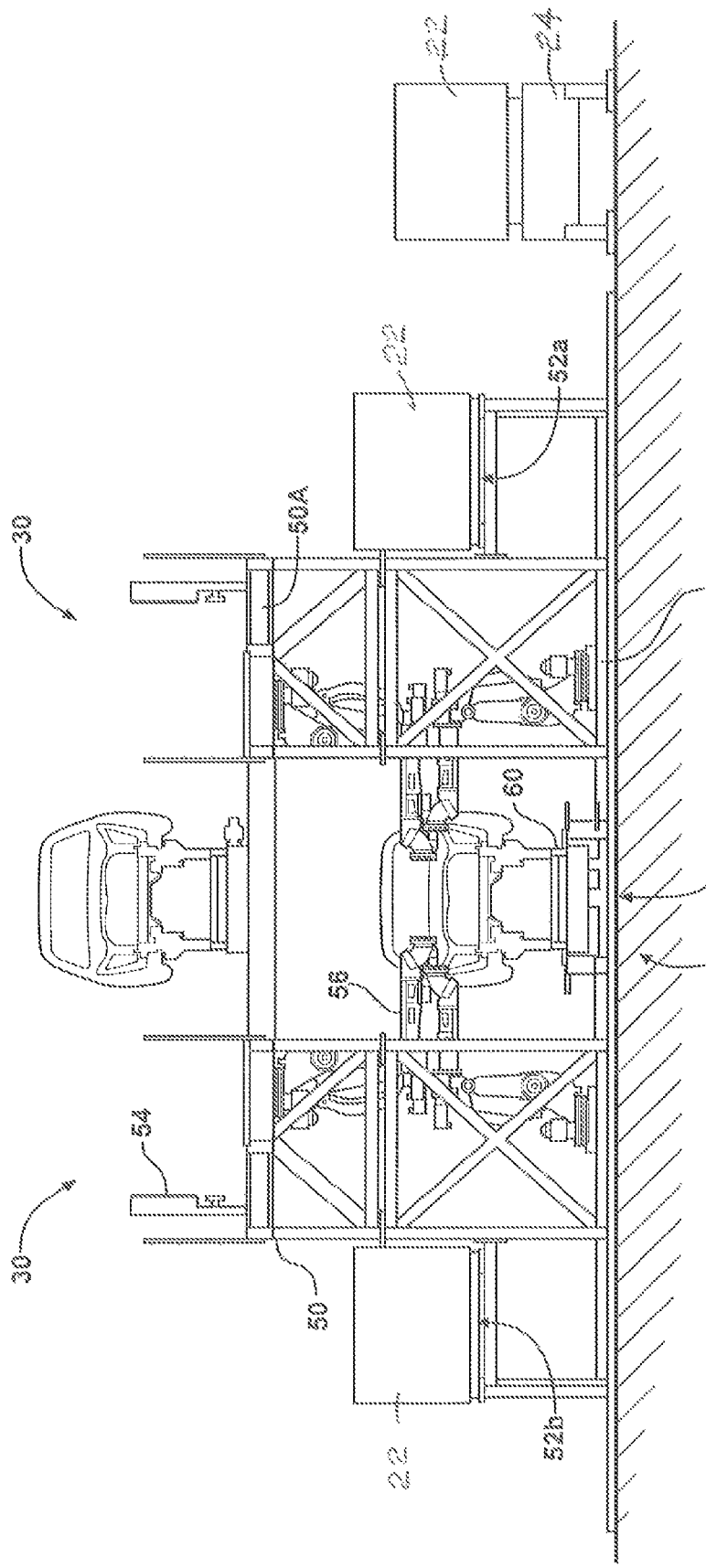
FIG. 6 is an end elevational view of a pallet assembly utilized in the invention body shop.

Each robotic pallet assembly 30 (FIGS. 2, 3 and 6) comprises an open scaffold structure including laterally spaced robot platform structures 50, outer flanking shelves 52a, 52b, robot controllers 54 mounted on robot platform structures 50, a plurality of robots 56, and a lower central conveyor structure 58 carrying a pallet 60 arranged for powered movement along central assembly line 47. For example, three robots 56 may be suspended from the platform 50A of one robot platform structure and two robots 56 may extend upwardly from the floor 50B of each robot platform structure for a total of ten robots.

Further details of the robotic pallet assembly 30 may be seen in U.S. Pat. No. 6,948,227 which is assigned to the assignee of the present invention and the disclosure of which is incorporated herein by reference.

Tool management area 17 consists of a plurality of different model tooling for use by the robotic welding assembly devices to respectively produce various different motor vehicle models. For example, tool management area 17 may include tooling 17a, 17b, 17c, 17d, 17e and 17f to assist the robotic welding assemblies to respectively produce first, second, third, fourth, fifth and sixth motor vehicle models.

Figure 7:
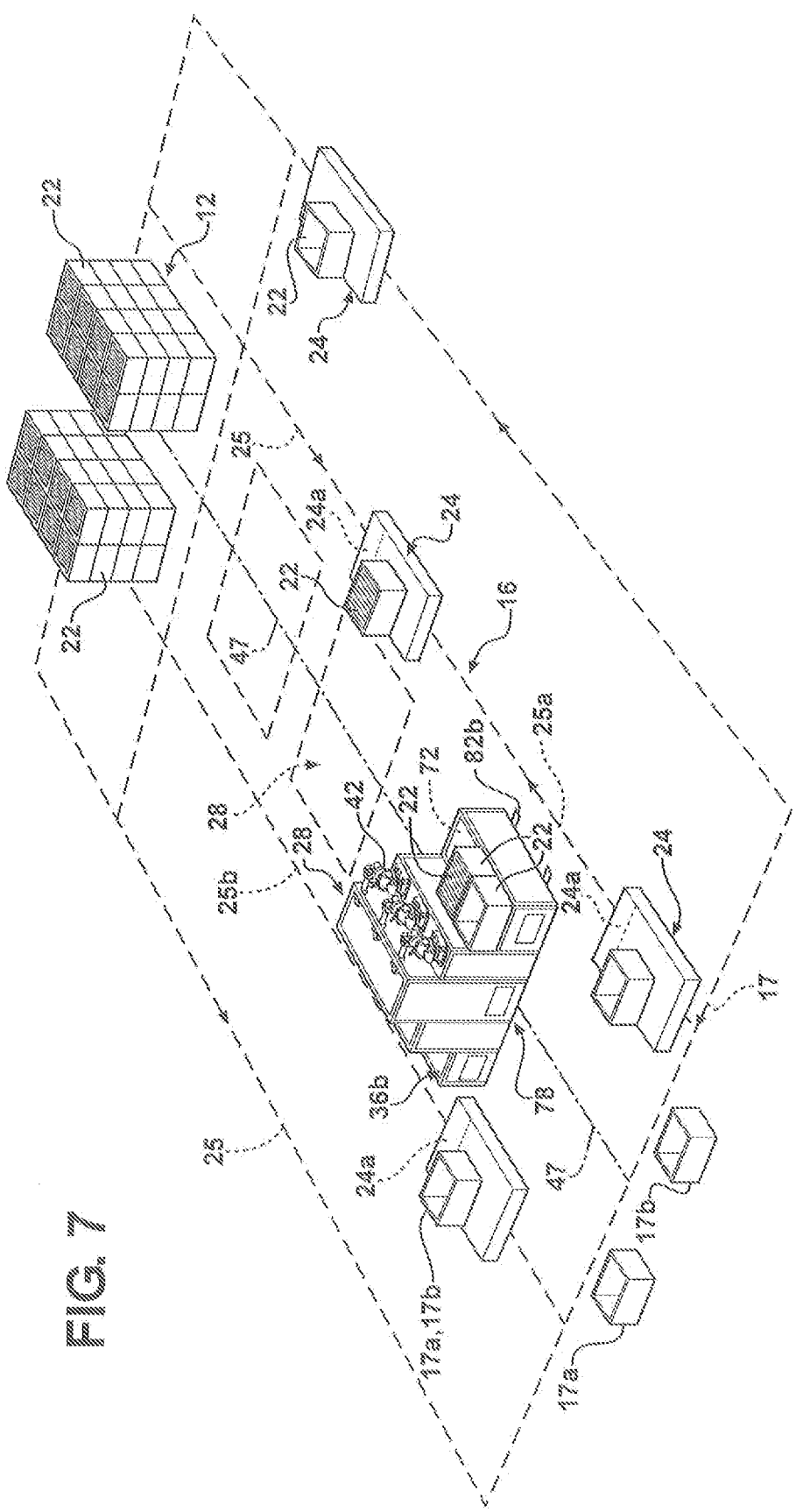
FIG. 7 is a schematic perspective view of a portion of the welding body shop.
Figure 8:
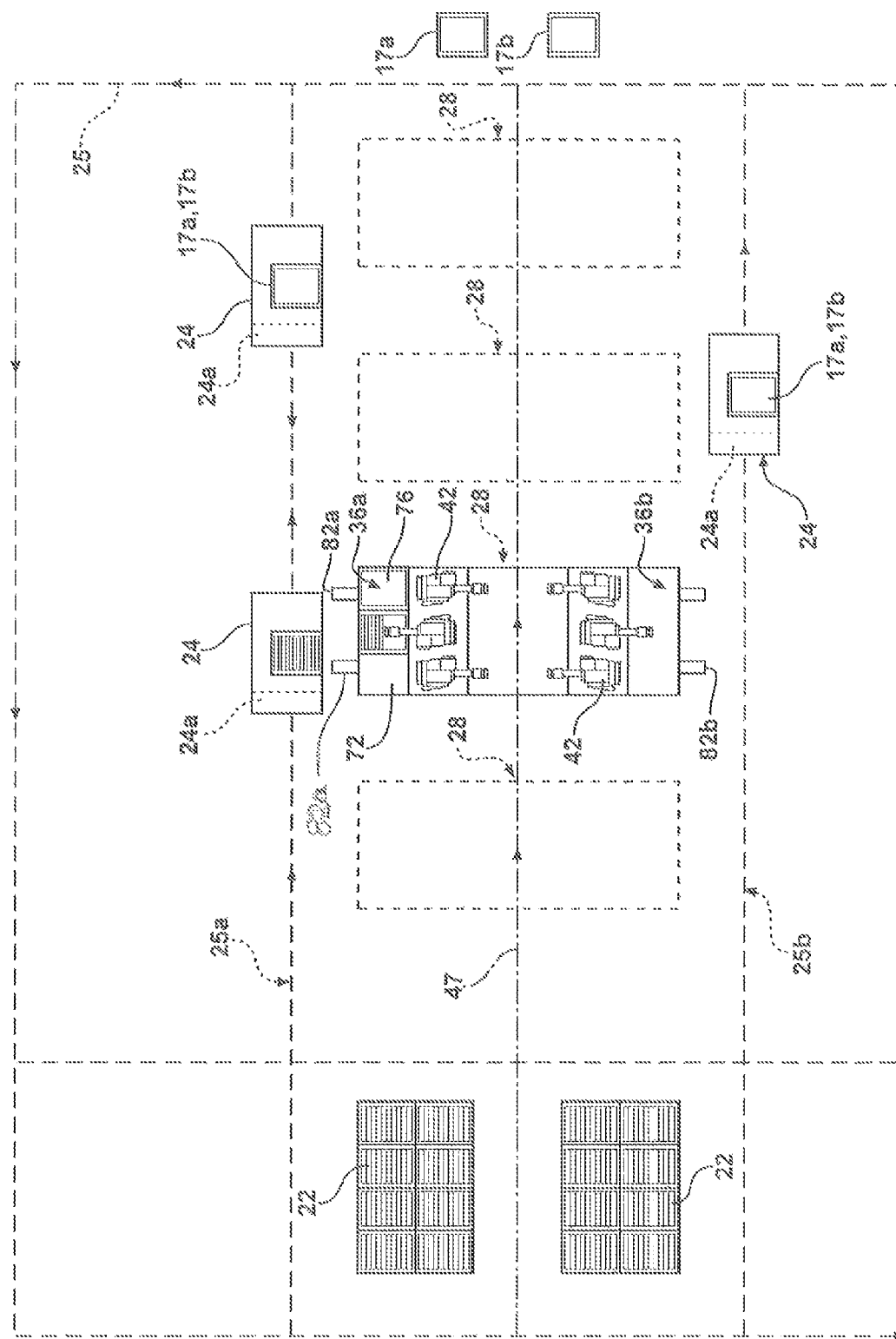
FIG. 8 is a schematic plan view of the portion of the welding body shop seen in FIG. 7.

In overview, parts or the like arrive in dunnage via rail 18 or truck 20 to loading docks whereafter the parts are removed from the dunnage and loaded onto parts racks 22 whereafter, as needed, AGVs 24 receive the parts racks and travel to the left into the subassembly area 14 and the main line area 16. The material will be staged with a certain model or sequence of various models of the product line that is being assembled. Some of the material will be upgraded in the subassembly area and then moved to the main line but in any event the material flow goes right to left. All of the main line rows are similar. The three on the bottom as seen as in FIG. 1 are roller assemblies 28 and the three on the top as seen in FIG. 1 are pallet assemblies 30. In general, the roller assemblies are utilized to build the geometric of the vehicle which is the underbody and body side left and body side right and the pallet assemblies are utilized to build the underbody with spot framing and with spot and body closure decking or assembly. All of the material comes in dunnage which is engineered dunnage and presents a required number of components at the point of use. The system does not use any conveyors nor does it utilize any manual operations or anything to pollute the main line assembly. Material shelves are provided on each side of the roller assemblies and the pallet assemblies. These shelves are utilized to supply materials or parts to each roller or pallet assembly and/or utilized to deliver tooling to each roller or pallet assembly to facilitate changeover to a different body style. The aisle between each row of assemblies includes a main body aisle as well as walkways flanking the main body aisle and adjacent to the material shelves of the assemblies. The AGVs 24 move along a movement path 25 which extends along each aisle and between each aisle and serves to totally interconnect the material management area 12, the subassembly area 14, the main line area 16, and the tooling management area 17. Path 25, as best seen in FIGS. 7 and 8, may include a path portion 25a extending along one side of aligned roller assemblies 28 and a path portion 25b extending along an opposite side of the aligned assemblies.

With this movement path 25, AGVs may, as shown, at times be moving in side-by-side fashion with one AGV delivering parts or tooling in an upper aisle as seen in FIG. 1 and another AGV delivering parts or tooling in an adjacent lower aisle in FIG. 1. The material or tooling delivered by each AGV is delivered to the shelf structures of the roller or pallet assemblies whereafter the parts or tooling are moved to working in-use positions. This arrangement eliminates the necessity for people to be involved or for conveyors to be involved.

Each AGV 24 comprises a small vehicle that may be for example six feet wide and fifteen feet long with four wheels on the bottom and battery operated and includes a load/unload mechanism typically in the form of a forklift mechanism shown schematically at 24A. The AGVs go up and down the aisles just like a small car and are guided through a positioning system such as a GPS system. Each AGV has an implant positioning system so that each factory column has a transmitter and each AGV has a receiver that identifies the location of the AGV within the plant so that the precise location of the AGV within the plant is always known. AGVs of this type are in common use in the automotive industry and have the ability to be guided through the factory, and perform load/unload functions, via a transmitter on the AGV. The system allows a batch build that specifically allows building one model and then plus one, plus one, plus one so that flexibility of the system is unlimited. The system can build, for example, 15 models but can also build one at time. The system can build one model for an hour and then one for five hours and then one for three hours and then one for nine hours and so forth. The key aspect of the system is engineered material flow. The system utilizes modular tooling and engineered product flow and enables movement from parts to sub assembly to main lines or directly to main line with all the parts being delivered using AGVs to the point of use so that the system decouples people from the main line. There are no people on the main line because all material comes in to the main line in a dunnage or in some kind of wrapping system. Material is always brought to a line, these AGVs traveling basically right to left. Material flow is a one way street except the outside aisles provide return movement for the empty parts racks. This arrangement yields a generally circular movement of the AGVs with the AGVs moving down the top three aisles as seen in FIG. 1, turning right at the end of the aisle for passage to the upper aisle and the AGVs in the lower three aisles making a left turn as they move beyond the main line area for movement to the lower or outer aisle and movement back to the material management area to receive further parts and begin a new supply cycle. As noted the AGVs are powered and each has a battery. An AGV parking and charging area 70 is provided to allow the AGVs to park themselves into an electric receptacle and be charged. The AGVs thereby basically recharge themselves for a period of time and move back into operation.

The AGVs function not only to bring component parts to the various weld stations for welding on the assembly line but also function to exchange the tooling at the weld stations to effect motor vehicle model changeover.

Figure 9:
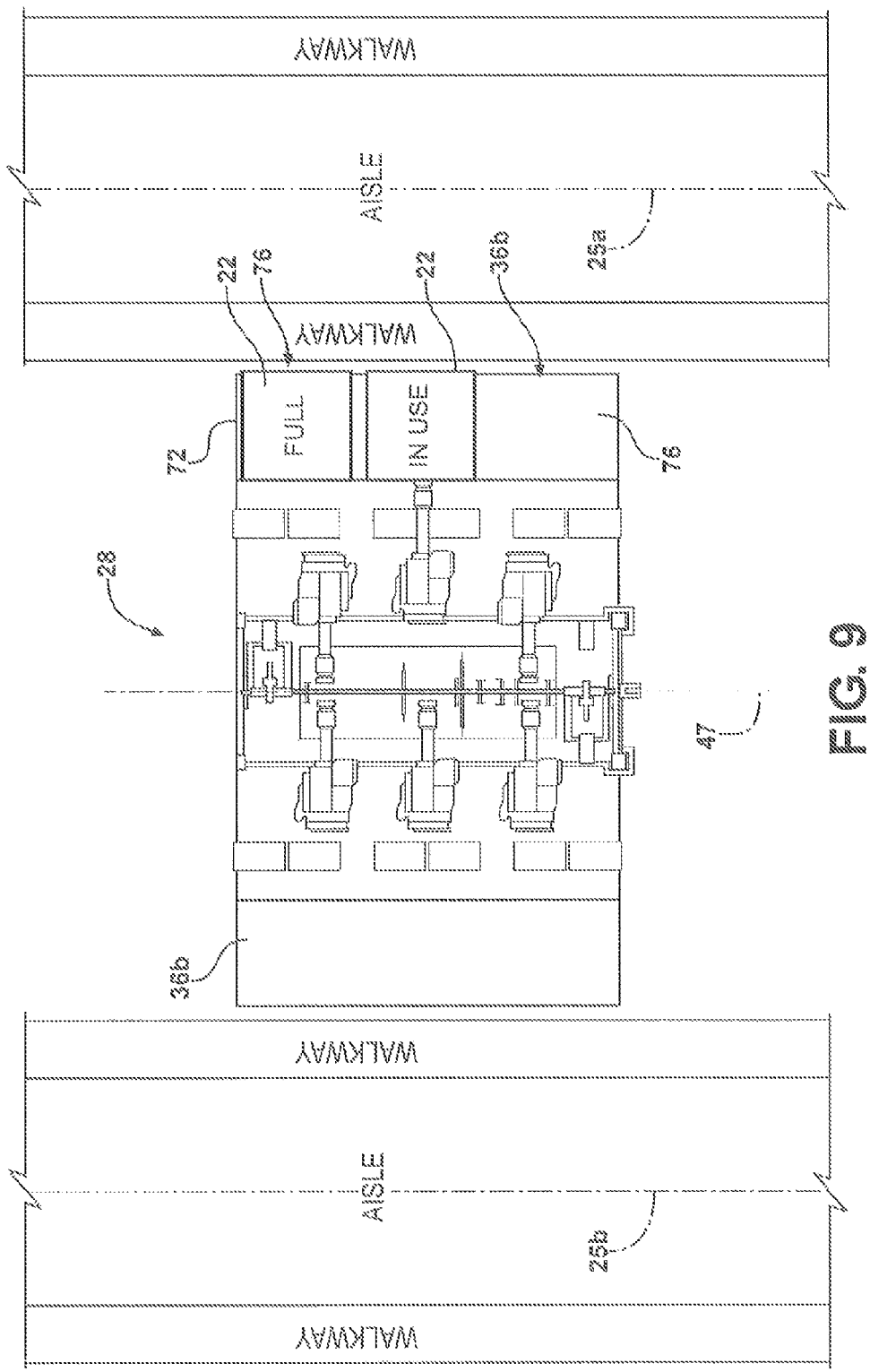
FIGS. 9-13 are sequential views illustrating a component parts delivery system according to the invention.
Figure 10:
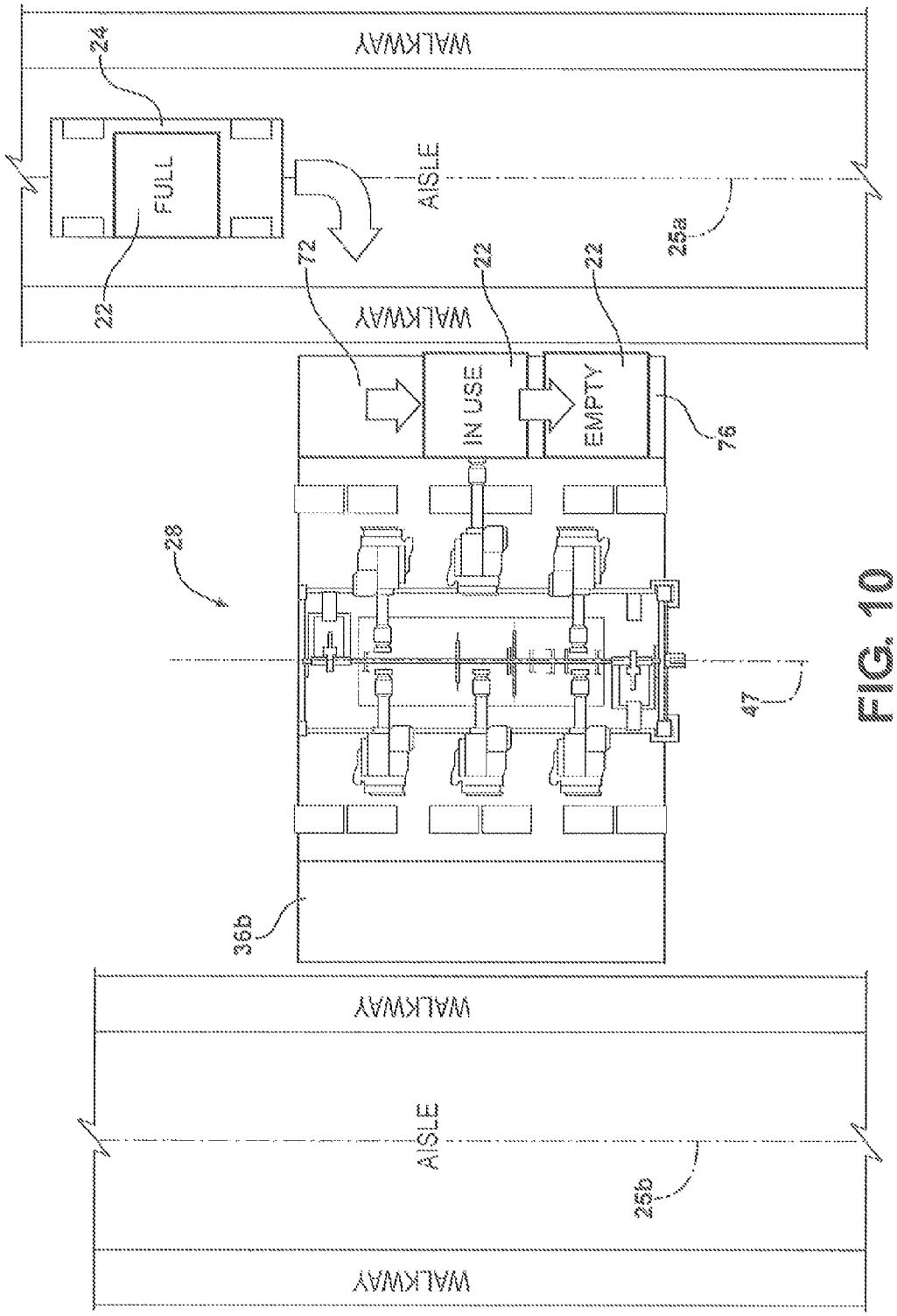
Figure 11:
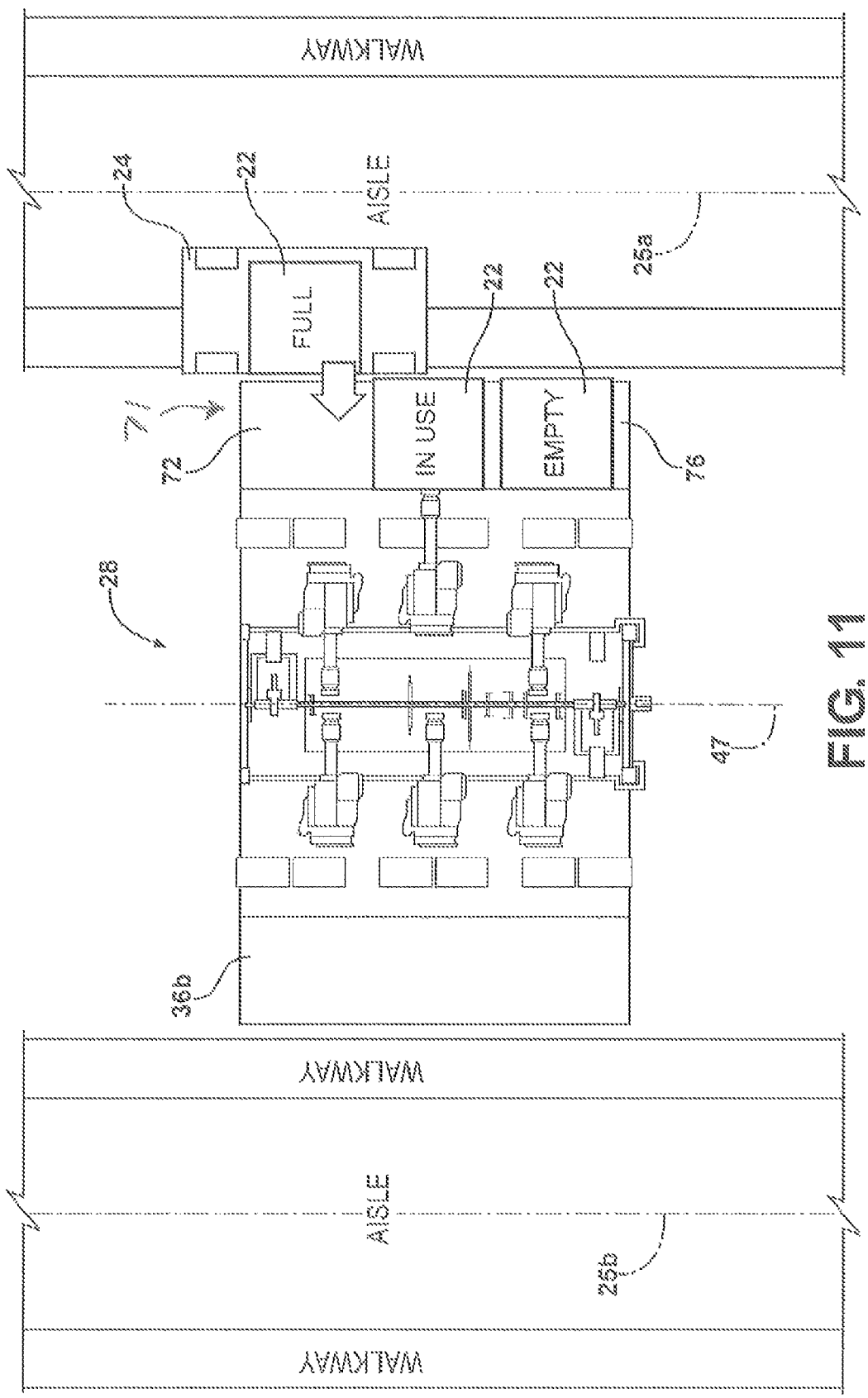
Figure 12:
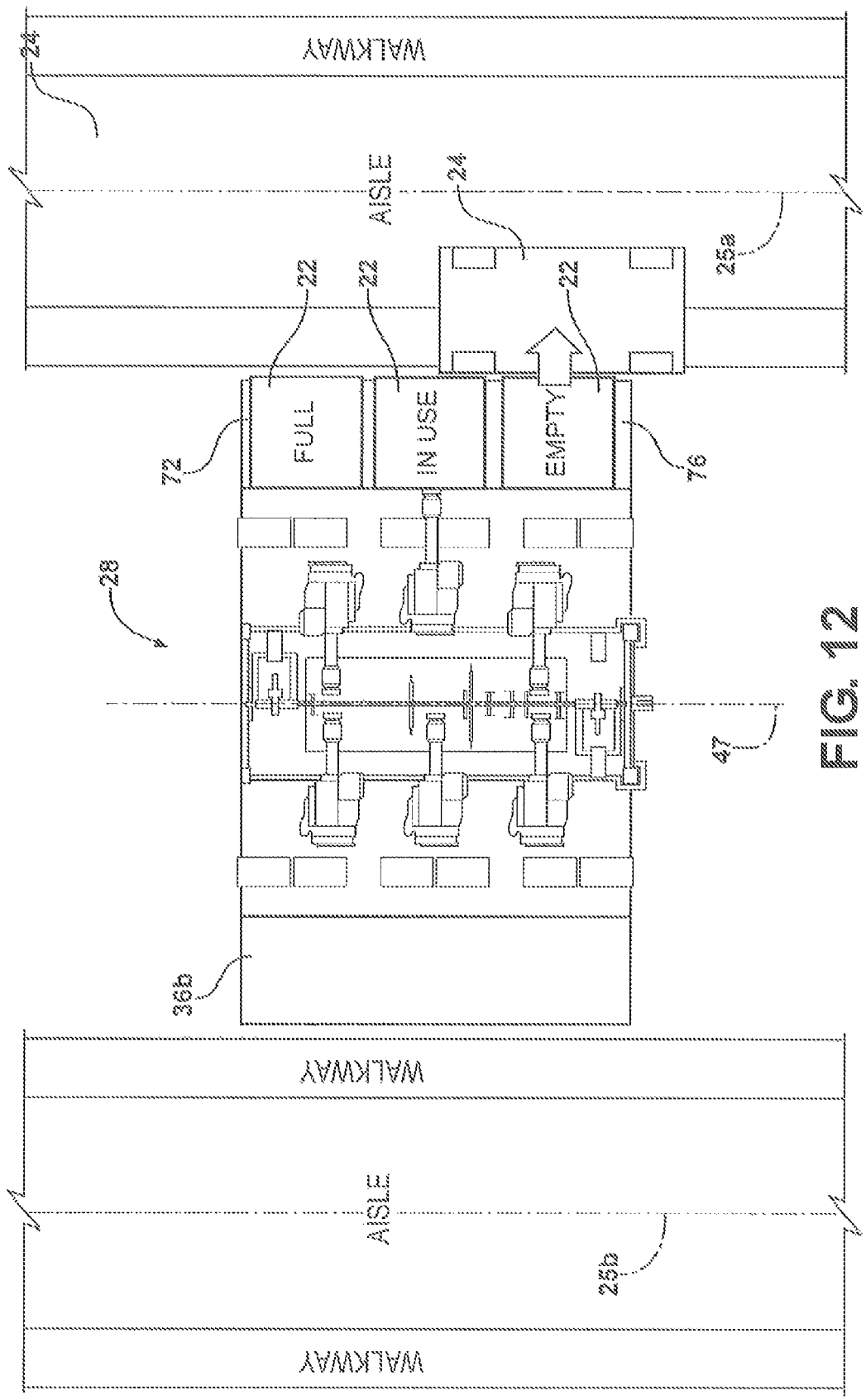

The manner in which the AGVs function to deliver component parts to the weld stations is best seen in FIGS. 7, 8, 9 and in sequential FIGS. 9-13.

Figure 13:
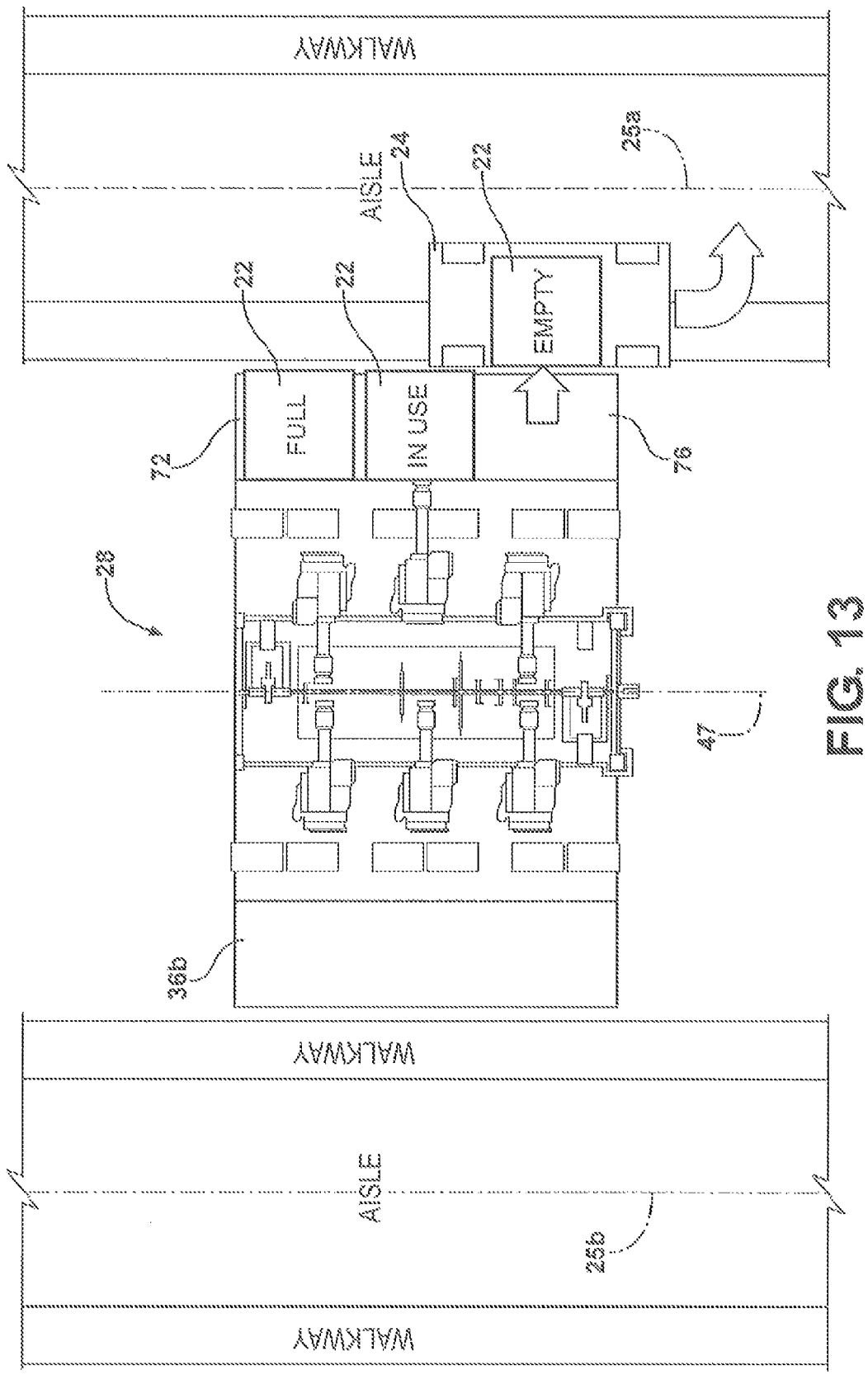

With respect to the delivery of components to a robotic roller assembly 28 and with particular reference to FIGS. 9-13, a staging area 71 is provided on a shelf 36 of each assembly 28 including a substage waiting area 72, a substage in-use area 74, and a substage empty area 76 arranged sequentially along and proximate the adjacent portion of the movement path 25 of the AGV. With a full parts rack 22 positioned in the in-use area 74 for use by the robotic welding assembly, an empty rack 22 positioned in the empty area 76, and a void in the waiting area 72 (FIG. 10), the system operates to move an AGV 24 carrying a full parts rack 22 from the source of parts 12 to the staging area 71 (FIG. 11), unload the full parts rack 22 onto the waiting area 72, unload the empty parts rack 22 onto the AGV 24 (FIG. 12), and return the AGV 24 to the source of parts 12 (FIG. 13).

As seen, the movement of an AGV 24 carrying a full parts rack from the source of parts to the staging area initially comprises movement of the AGV to the substage waiting area (FIG. 11), whereafter the full parts rack is loaded onto the substage waiting area, the AGV is moved to the substage empty area (FIG. 12), the empty parts rack is loaded onto the AGV, and the AGV is returned to the source of parts (FIG. 13).

This system is further operative following depletion of the parts from the full parts rack 22 at the in-use area 74, to move the now empty parts rack 22 from the in-use area to the now empty empty substage 76 and move the full parts rack 22 at the waiting area 72 to the now empty in-use area 74 for use by the robotic welding device 28, whereafter the system is operative to again move an AGV 24 carrying a full parts rack 22 from the source of parts 12 to the staging area 71, unload the full parts rack 22 onto the waiting area 72, unload the empty parts rack 22 onto the AGV 24, and return the AGV 24 to the source of parts 12.

It will be understood that the loading of parts racks 22 onto the AGV and the unloading of parts racks from the AGV is accomplished utilizing the forklift mechanism 24a of the AGV; the movement of the parts racks between the substage areas 72, 74, 76, is accomplished using a robot 42 of the related robotic roller assembly 28; the movement of component parts from the parts rack at the substation in-use area 74 for use in forming the motor vehicle body structure is accomplished by a robot 42 of the related robotic roller assembly 28; and the actual welding of the component parts to form the motor vehicle body is also accomplished by a weld robot 42 of the related robot roller assembly.

It will further be understood that the above described component delivery procedure may be carried out utilizing either shelf 36a or opposite shelf 36b and it will be further understood that component parts in parts racks 22 are supplied to either shelf 50b, 50b of the robot pallet assemblies 30 by the AGVs in the same manner as described with respect to the robot roller assemblies.

Figure 14:
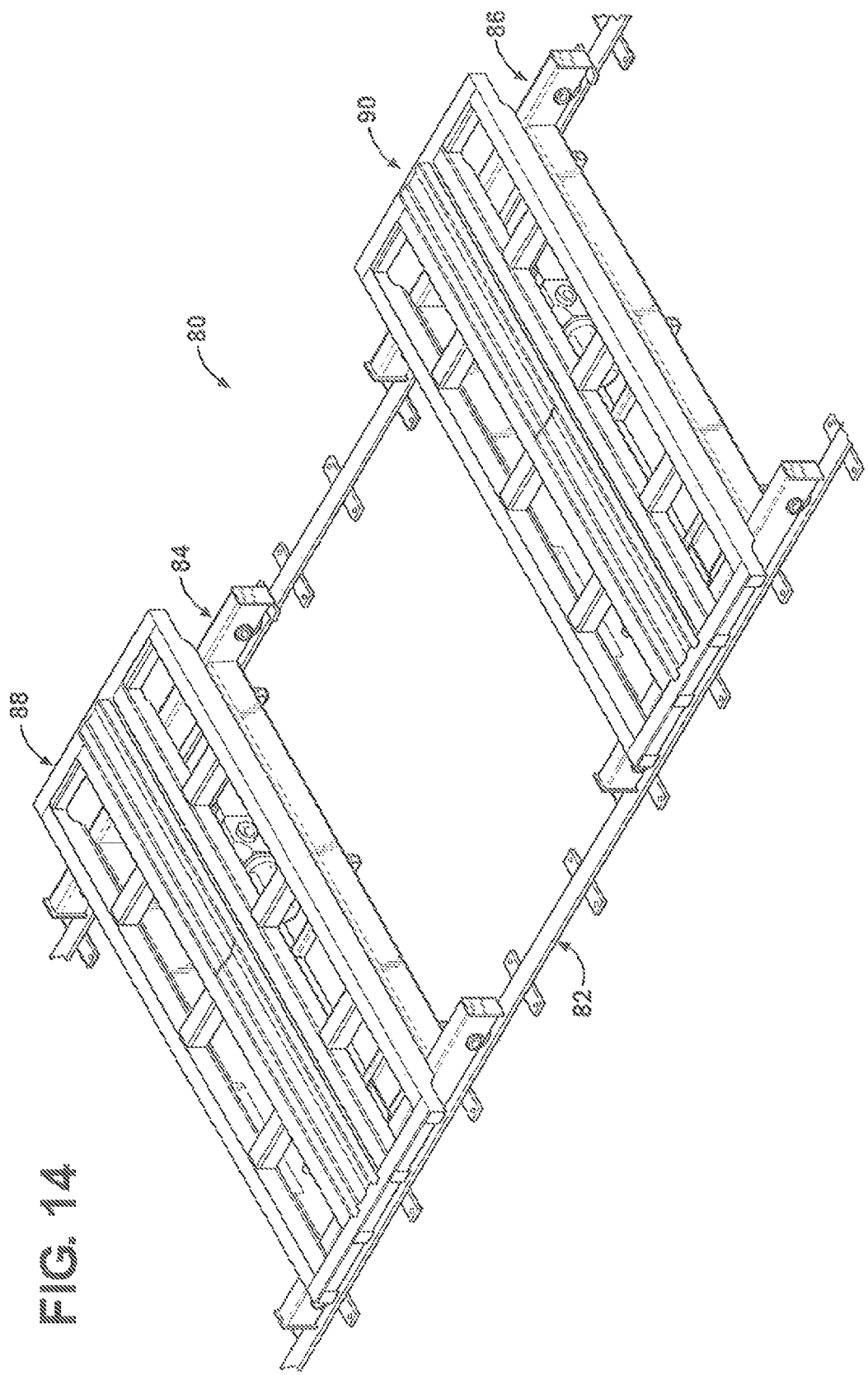
FIG. 14 is a fragmentary perspective view of a tooling transfer apparatus.
Figure 15:
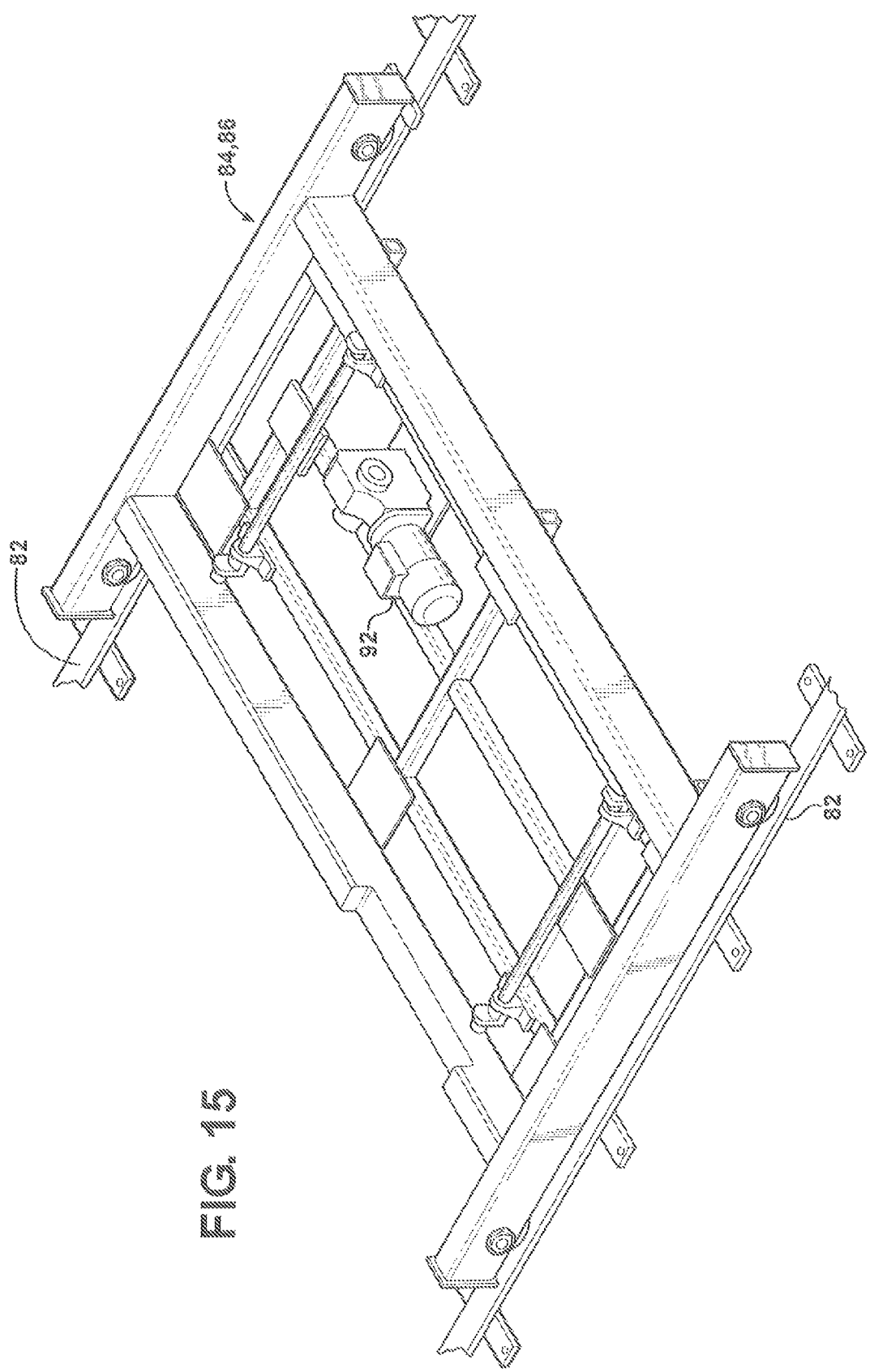
FIG. 15 is a fragmentary perspective view illustrating a trolley utilized in the tooling transfer apparatus of FIG. 14.
Figure 16:
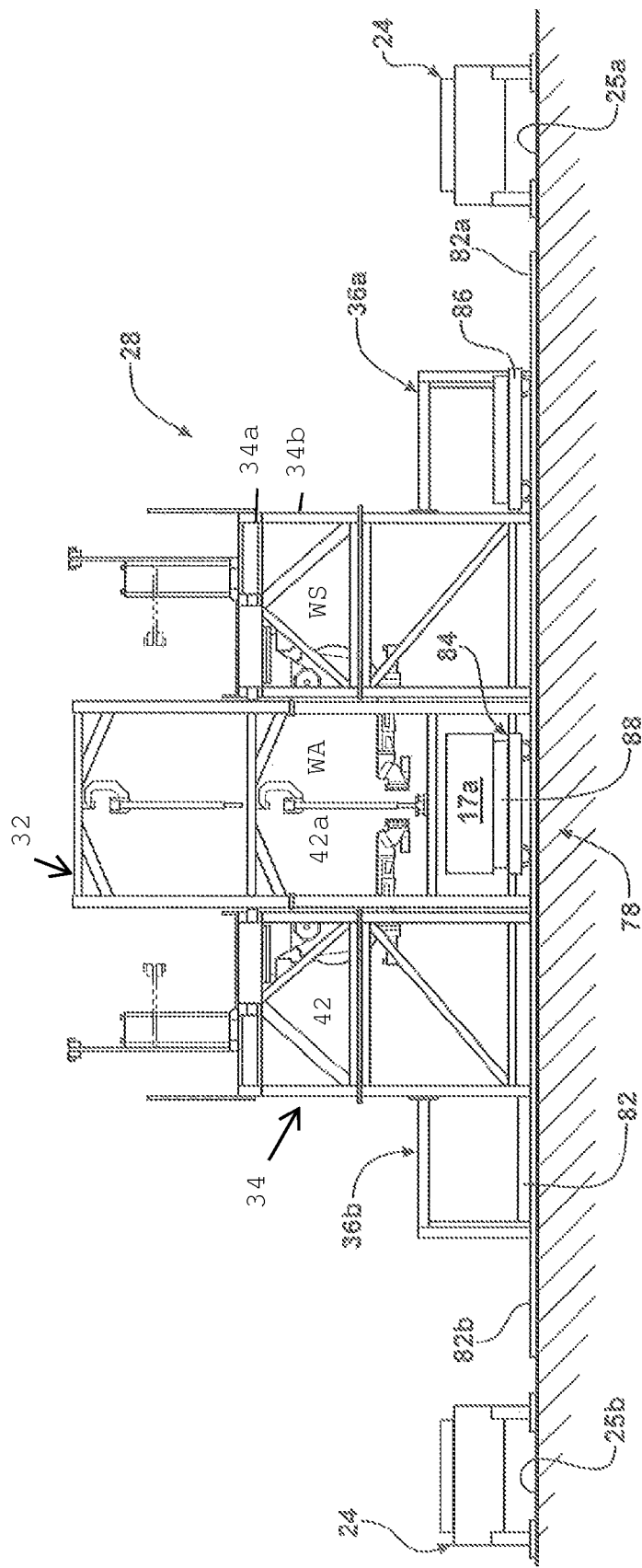
Figure 17:
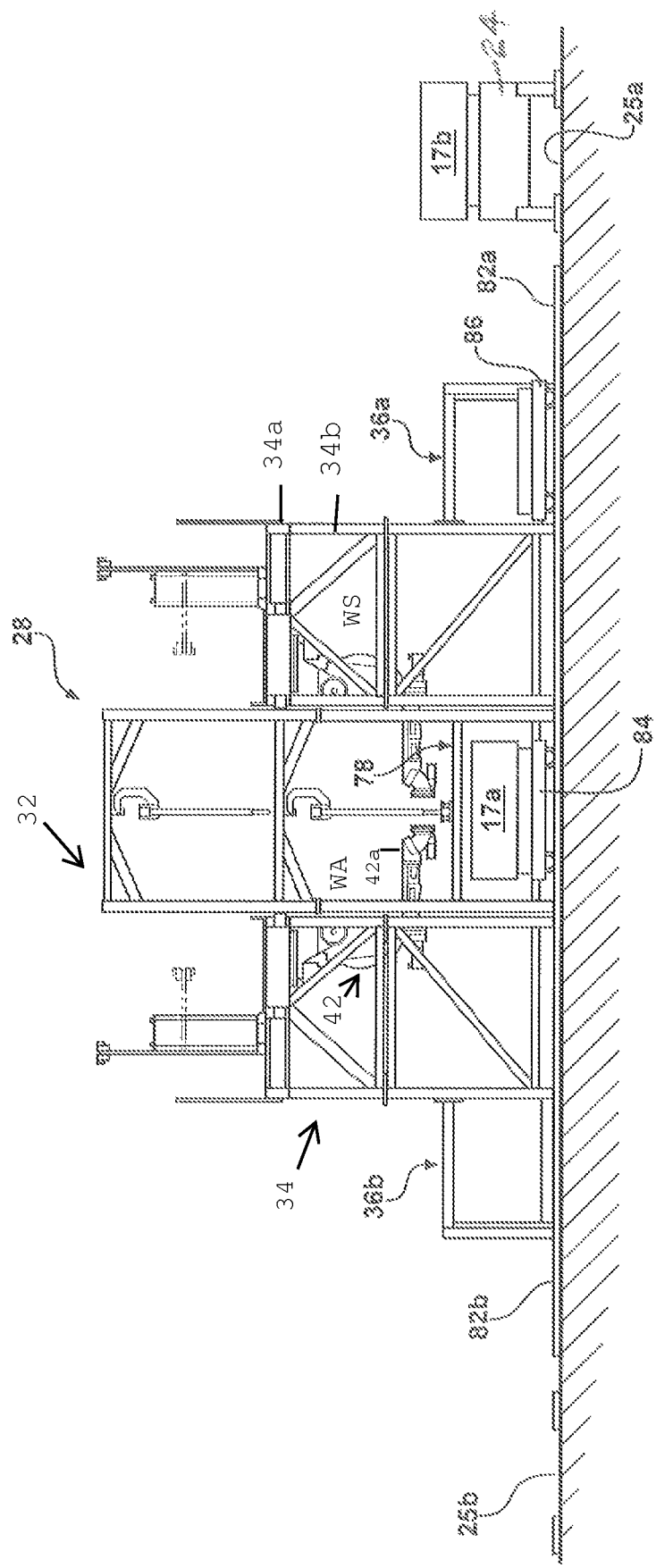
Figure 16:
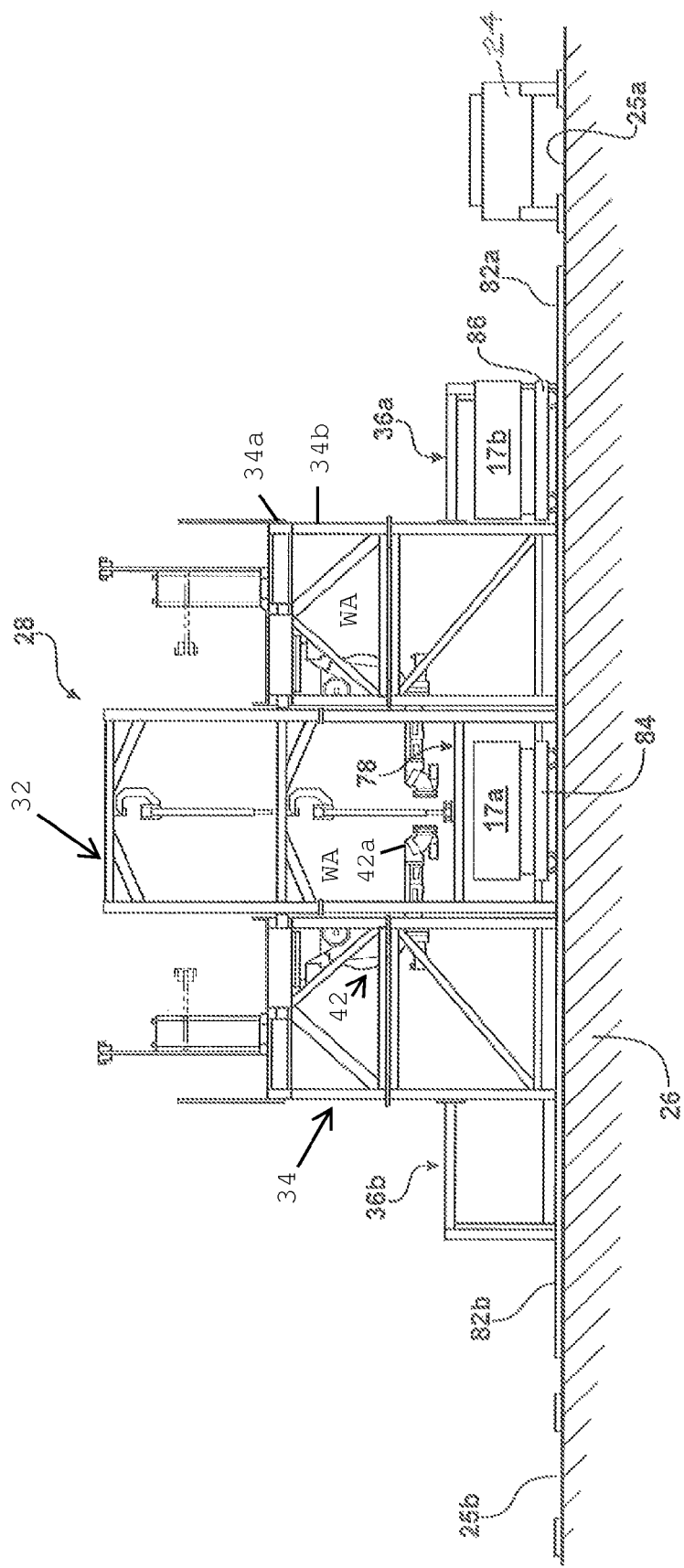

With respect to the use of the AGVs to change tooling at a robotic assembly 28 or 30, and with particular reference to FIGS. 14 and 15, a tooling shuttle assembly 80 is positioned transversely beneath the assembly 28. Assembly 80 includes a pair of parallel tracks 82, a pair of trolleys 84, 86 rollably positioned on the tracks, and a pallet 88, 90 carried on each trolley.

Tracks 82 will be seen to extend from a first end 82a proximate an AGV path portion 25a to a second end 82b proximate an AGV path portion 25b.

Each trolley 84, 86 includes an electric motor 92 together with suitable mechanisms operative to propel the trolleys along the tracks in response to energization of the motor.

Each pallet 88/40 is sized to be positioned on top of a respective trolley 84, 86.

Figure 19:
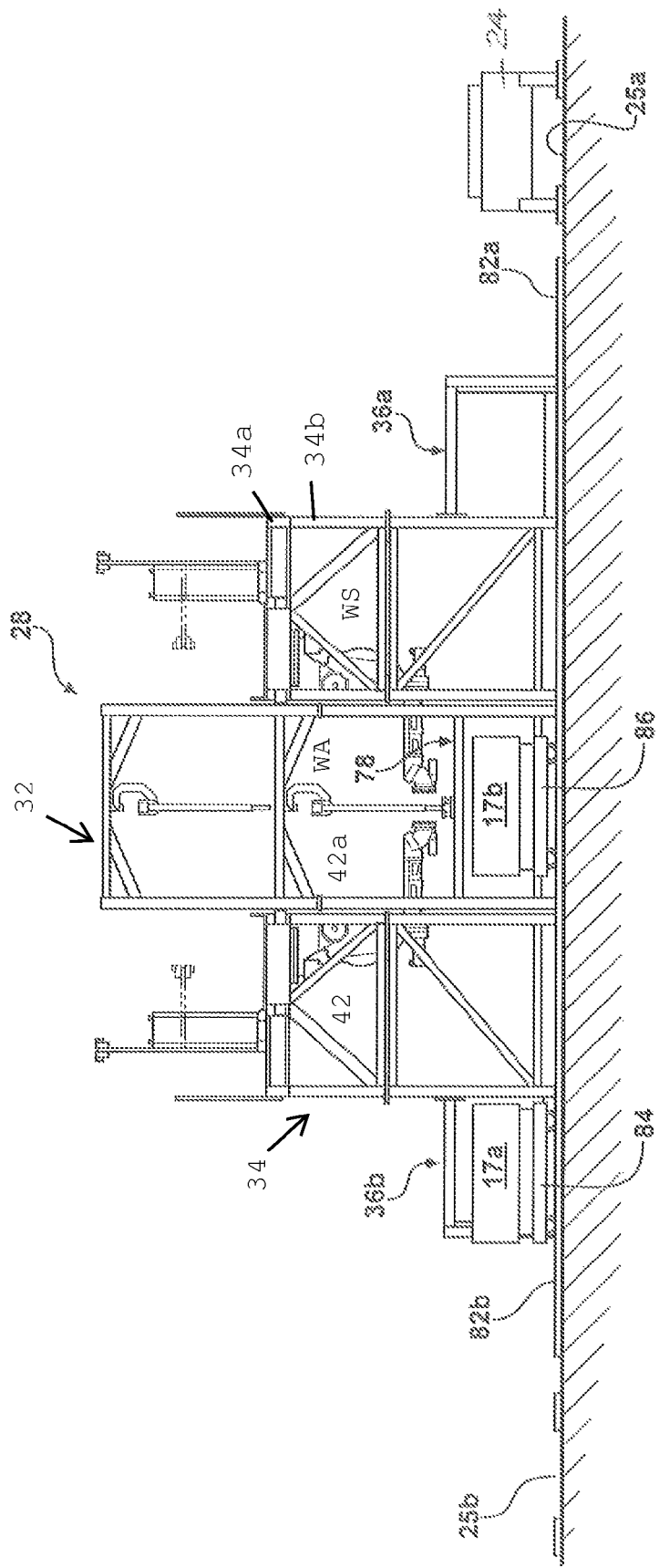
Figure 20:
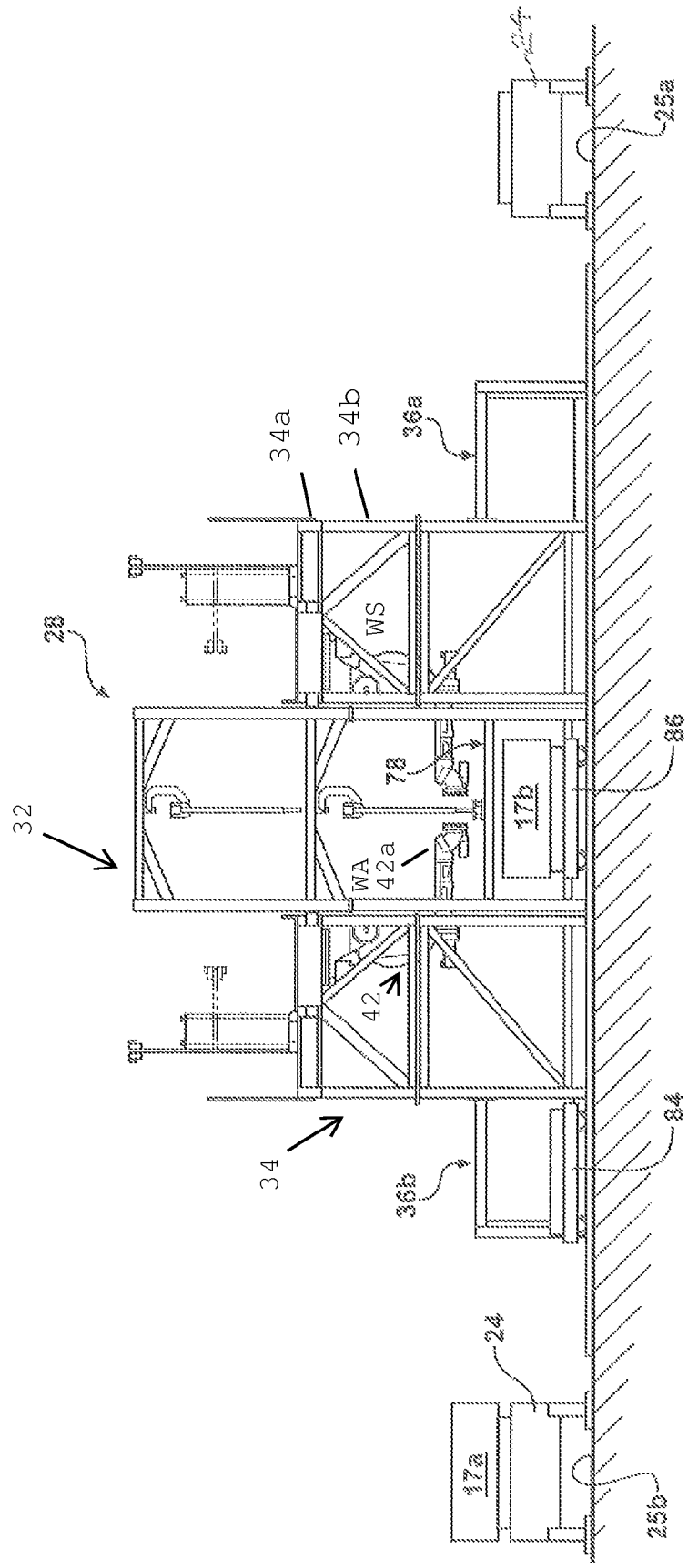

The manner in which the shuttle assembly 80 is utilized to change tooling at assembly 28 is best seen in FIG. 16-21. Specifically, with initial reference to FIG. 16, with tooling 17a in place and in use at a tooling use area 78 positioned centrally of the robotic roller assembly 28 proximate the assembly line 47, an AGV 24 traveling on movement path 25a may be utilized to bring a tooling 17b to the roller assembly (FIG. 17) and load the tooling 17b into the trolley 86 positioned beneath the shelf 36a of the roller assembly utilizing the load/unload mechanism of the AGV (FIG. 18), whereafter, when tooling 17a usage is completed, trolley 84 is propelled to the left as seen in FIG. 19 to move the tooling 17a to a position beneath the shelf 36b on the opposite side of the roller assembly while trolley 86 is propelled to the left to move the tooling 17b to the tooling usage area 78 (FIG. 20), whereafter the tooling 17a may be loaded onto an AGV 24 traveling the movement path 25b on the other side of the assembly (FIG. 21) utilizing the AGV forklift mechanism 24a, whereafter the AGV is operative to return the tooling 17a to the tooling management area 17.

During usage of tooling 17b, further tooling may be brought to the left side of the assembly 28, utilizing an AGV traveling on movement path 25b, whereafter the further tooling may be loaded onto trolley 84 whereafter, when the usage of tooling 17b is completed, trolley 86 may be moved to the right to allow loading of tooling 17b onto an AGV 24 positioned to the right of the assembly for return on movement path 25a to the tooling area whereafter trolley 84 may be moved to the tooling use area 78 to position the further tooling at the tooling use area for use in fabricating a further motor vehicle model.

It will be understood that the tooling provided to the robotic assembly in each case includes tooling specific to the motor vehicle model being assembled and may include, for example, clamps or end effector tooling which is utilized by the robots of the assembly to facilitate the welding operations to form the motor vehicle body or motor vehicle body subassembly.

In the overall operation of the system, AGVs 24 are continually picking up parts racks 22 from the material management area 12 and taking the parts racks to the main line 17 for use by the various assemblies 28/30 while different AGVs serve to change tooling at the various assemblies 28/30, at such times as a specific model production is terminated and a new model production is initiated. The invention system makes possible a tooling exchange time of between two to three minutes.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A motor vehicle body shop system comprising:
   a body assembly line;
   a robotic welding assembly device (RAD) positioned on the assembly line, the assembly device including a first and a second longitudinally extending scaffolding structure positioned on opposing sides of the assembly line, each scaffolding structure is stationary and includes a top wall and a plurality of support columns to define a working space below the top wall and a work area positioned along the assembly line between the first and the second scaffolding structures, at least one inverted robot connected to at least one of the first and second scaffolding structure top wall extending downward into the working space;
   a source of parts (SOP) positioned along a path of travel in communication with the welding assembly device;
   a first model tooling (FMT) and a second model tooling (SMT) in selective communication with the work area;
   at least one guided device for supporting at least one part moveable along the path of travel between at least the source of parts to a position adjacent to at least one of the first and the second scaffolding structures, wherein the at least one inverted robot transfers the at least one component from the guided device through the working space and into the work area;
   a tooling management area positioned along the path of travel distant from the welding assembly device and in communication with the welding assembly device, the tooling management area selectively housing the first model tooling and the second model tooling; and
   a tool shuttle assembly positioned transverse to the assembly line through the working space in communication with the work area, the first and the second tooling selectively engaged with the tool shuttle to selectively move the first and the second tooling through the working space into the work area, wherein:
   the at least one guided device selectively supports and reciprocally transfers the first and second model tooling from the tool management area along the path of travel to a position adjacent the first or the second scaffolding structure for engagement of the first and the second model tooling with the tool shuttle.

2. A motor vehicle body shop system according to claim 1 wherein the source of parts further comprises a plurality of parts racks, the guided device supporting at least one part rack.

3. The system of claim 1 further comprising a pallet for selectively supporting one of the first or the second model tooling, the pallet selectively moveable along the assembly line between the tooling management area and the work area.

4. The system of claim 3 further comprising:
   a plurality of inverted robots connected to the top wall of the first and the second scaffold structures; and
   a plurality of upright robots positioned in the work space and connected to a floor structure, at least one of the inverted and upright robots operable to selectively engage a part from the guided device and transfer the part through the work space into the work area.

5. The system of claim 1 further comprising:
   a flanking shelf adjacent at least one of the first or the second scaffolding structure;
   a device for moving the at least one component from the guided device onto the shelf, wherein the guided device is selectively positioned adjacent the flanking shelf.

6. The system of claim 1 wherein the guided device is an automated guided vehicle (AGV).

7. A motor vehicle body assembly system comprising:
   a body assembly line;
   a robotic welding assembly device positioned on the assembly line, the assembly device including a first and a second longitudinally extending scaffolding structure positioned on opposing sides of the assembly line, each scaffolding structure is stationary and includes a top wall and a plurality of support columns to define a working space below the top wall and a work area positioned along the assembly line between the first and the second scaffolding structures, a plurality of inverted and upright robots positioned in working space of the first and the second scaffolding structures and selectively extendible into the work area;
   a source of parts positioned along a path of travel in communication with the welding assembly device;

a tool management area for selectively housing a first model tooling (FMT) and a second model tooling (SMT) the tool management area positioned along the path of travel and in communication with the work area; and a plurality of guided devices selectively moveable along the path of travel between the tool management area, source of parts and welding assembly device for selective engagement, support and transfer of the first and second model tooling and parts for supporting at least one part moveable along the path of travel between at least the source of parts to a position adjacent to at least one of the first and the second scaffolding structures, wherein at least one the plurality of inverted or upright robots engage the part and transfer the part through the working space and into the work area.

8. The system of claim 7 further comprising a tool shuttle assembly positioned transverse to the assembly line through the working space in communication with the work area, the first and the second tooling selectively engaged with the tool shuttle to selectively move the first and the second tooling through the working space into the work area.

9. The system of claim 7 further comprising:
a flanking shelf adjacent at least one of the first or the second scaffolding structure;
a device for moving the at least one component from the guided device onto the shelf, wherein the guided device is selectively positioned adjacent the flanking shelf.

10. The system of claim 7 wherein the guided devices are automated guided vehicles (AGV).

* * * * *